United States Patent
Britton et al.

(10) Patent No.: US 6,442,577 B1
(45) Date of Patent: Aug. 27, 2002

(54) METHOD AND APPARATUS FOR DYNAMICALLY FORMING CUSTOMIZED WEB PAGES FOR WEB SITES

(75) Inventors: Zachary E. Britton; Derek S. Maxson, both of Sonora, CA (US)

(73) Assignee: Front Porch, Inc., Sonora, CA (US)

( * ) Notice: Subject to any disclaimer, the term of this patent is extended or adjusted under 35 U.S.C. 154(b) by 0 days.

(21) Appl. No.: 09/185,145

(22) Filed: Nov. 3, 1998

(51) Int. Cl.[7] .............................................. G06F 17/21
(52) U.S. Cl. ........................ 707/513; 705/27; 709/218
(58) Field of Search ............................. 707/513, 501.1; 705/26–27, 14; 345/760; 709/203, 217–219

(56) References Cited

U.S. PATENT DOCUMENTS 5,933,811 A * 8/1999 Angles et al. ................ 705/14
6,009,410 A * 12/1999 LeMole et al. ............... 705/1
6,141,666 A * 10/2000 Tobin .......................... 707/513
6,308,188 B1 * 10/2001 Bernardo et al. .......... 707/501.1

OTHER PUBLICATIONS

Kohda et al, "Ubiquitous Advertising on the WWW", 5h Int'l WWW Conf., Paris, 1996, <http://www5conf.inria.fr/fich$_{13}$html/papers/P52/Overview.html>, 8 pages.*

* cited by examiner

Primary Examiner—Joseph H. Feild
(74) Attorney, Agent, or Firm—Robroy R. Fawcett (57) ABSTRACT

To attract traffic flow from other web sites, such as Internet Service Providers (ISPs) and organizations that have direct access to the Internet, an Internet Content Provider (ICP) dynamically forms customized web pages for its participating web sites. Specifically, the ICP stores web page files designed for itself and its participating web sites. Upon receiving a service request from a participating web site, the ISP dynamically forms customized web pages for the participating web site by combining the page files designed for itself and the page files designed for the participating web site.

30 Claims, 7 Drawing Sheets

METHOD AND APPARATUS FOR DYNAMICALLY FORMING CUSTOMIZED WEB PAGES FOR WEB SITES

FIELD OF THE INVENTION

The present invention relates generally to forming web pages at Internet Content Provider (ICP) web sites, and more specifically to forming web pages for Internet Service Providers (ISPs) and organizations having direct access to the Internet.

BACKGROUND OF THE INVENTION

With the rapid development of information technology and networking infrastructure, Internet users can search through vast amounts of information provided by ICPs via the Internet. Most individual Internet users get access to the Internet by subscribing to Internet services from ISPs. The ISPs furnish the hardware and software to access the Internet for their subscribers. To access the Internet, an individual user first sends a service request to his/her ISP. Upon receiving the service request, the ISP processes the service request for the user who sent it. Usually, ISPs also have their own web sites for their users.

Some organizations, such as corporations, governmental institutions, and universities, have financial and technical resources to install their own hardware and software to access the Internet so that they can be connected to the Internet without using ISPs. Typically, these organizations have Intranet (or local area network) infrastructures for inter-connecting their internal users and for providing the internal users with access to the Internet. These organizations may also have their own web sites for external and internal users.

One main objective of ICPs is to get as many Internet users to visit their web sites as possible, because each time a web page is accessed by a visitor, the ICPs may get revenue for the advertisements contained in the web page. The inventors have been creating and managing web sites for many ICPs. In attempting to attract Internet traffic for their clients' web sites, the inventors have conducted research to determine traffic patterns flowing into a typical ICP web site. The research data demonstrated that ICP's web sites have a great potential to attract Internet traffic from ISPs. This is especially true for the ISPs with poor quality web sites, having no local information, news, weather broadcasting, etc. The underline reason is that, unlike ICPs, ISPs usually do not have sufficient resource and expertise to design good quality web sites. Once an ISP user is connected to the Internet via an ISP, the user has the tendency to leave the ISP's web site and go to ICP's web sites to search for desired information.

Efforts have been made to persuade some ISPs to use ICPs' web sites as the default home pages for their subscribers. However, these ISPs declined such offers, noting that they can gain no benefits from this arrangement. In fact, these ISPs felt using an ICP's home page may have a negative effect on their businesses. For example, a subscribed user who came to an ICP's web site may see advertisements from competing ISPs, which could result in losing that ISP user.

ICPs can also attract Internet traffic from organizations that have direct access to the Internet. Like ISPs, these organizations also have the same limitations and concerns.

Accordingly, it is desirable to dynamically form customized web pages at an ICP web site to satisfy different needs and requirements for different ISPs and organizations. Such an approach can create a win-win relationship between an ICP and an ISP, or between an ICP and an organization. The ISP, or the organization, could get a much better Internet portal that provides value added services to its subscribers or internal users, without having negative impacts on its business. The ICP, in turn, would receive increased traffic.

There is, therefore, a need for a method and apparatus which enable an ICP to dynamically form customized web pages for ISPs and organizations that have direct access to the Internet.

There is another need for a method and apparatus which enable an ICP to dynamically select advertisements to be included in customized web pages.

The present invention provides the methods and apparatuses to meet these needs.

SUMMARY OF THE INVENTION

To address the shortcomings of the prior art, the present invention provides improved methods for dynamically forming customized web pages for ISPs, and organizations that have direct access to the Internet.

In one aspect, the present invention provides a method for dynamically forming customized web pages for a first type network node at a second type network node. The method comprises the steps of: forming at least a page file for the first type network node; forming at least a page file for the second type network node; receiving a service request from the first type network node; identifying the first type network node; and forming a customized page file formed for the first type network node by including the page file formed for the first type network node within the page file formed for the second type network node.

In another aspect, the present invention provides a method for providing web page customization service to a plurality of first type network nodes at a second type network node. The method comprises the steps of: forming at least a page file for each of the first type network nodes; forming at least a page file for the second type network node; receiving a service request from one of the first type network nodes; determining whether the first type network node participates in the web page customization service; if the first type network node participates in the web page customization service, forming a customized page file for the service request by including the page file formed for the first type network node within the page file formed for the second type network node; and if the first type network node does not participate in the web page customization service, forming a page file for the service request by using the page file formed for the second type network node.

In still another aspect, the present invention provides a method for providing web page customization service to a plurality of first type network nodes at a second type network node. The method comprises the steps of: forming a plurality of advertisements for the first type network nodes; forming at least a page file for the second type network node; receiving a service request from one of the first type network nodes; identifying advertisements for the first type network node; and forming a customized page file for the first type network node by including the identified advertisements within the page file formed for the second type network node.

The present invention also provides the apparatuses for performing the corresponding methods as recited above.

BRIEF DESCRIPTION OF THE DRAWING

The aforementioned advantages of the present invention as well as additional advantages thereof will be more clearly understood hereinafter as a result of a detailed description of a preferred embodiment of the invention when taken in conjunction with the following drawings in which.

DETAILED DESCRIPTION OF PREFERRED EMBODIMENTS

The present invention discloses novel methods and apparatuses for dynamically forming customized web pages for ISPs, and organizations that have direct access to the Internet.

Figure 1:
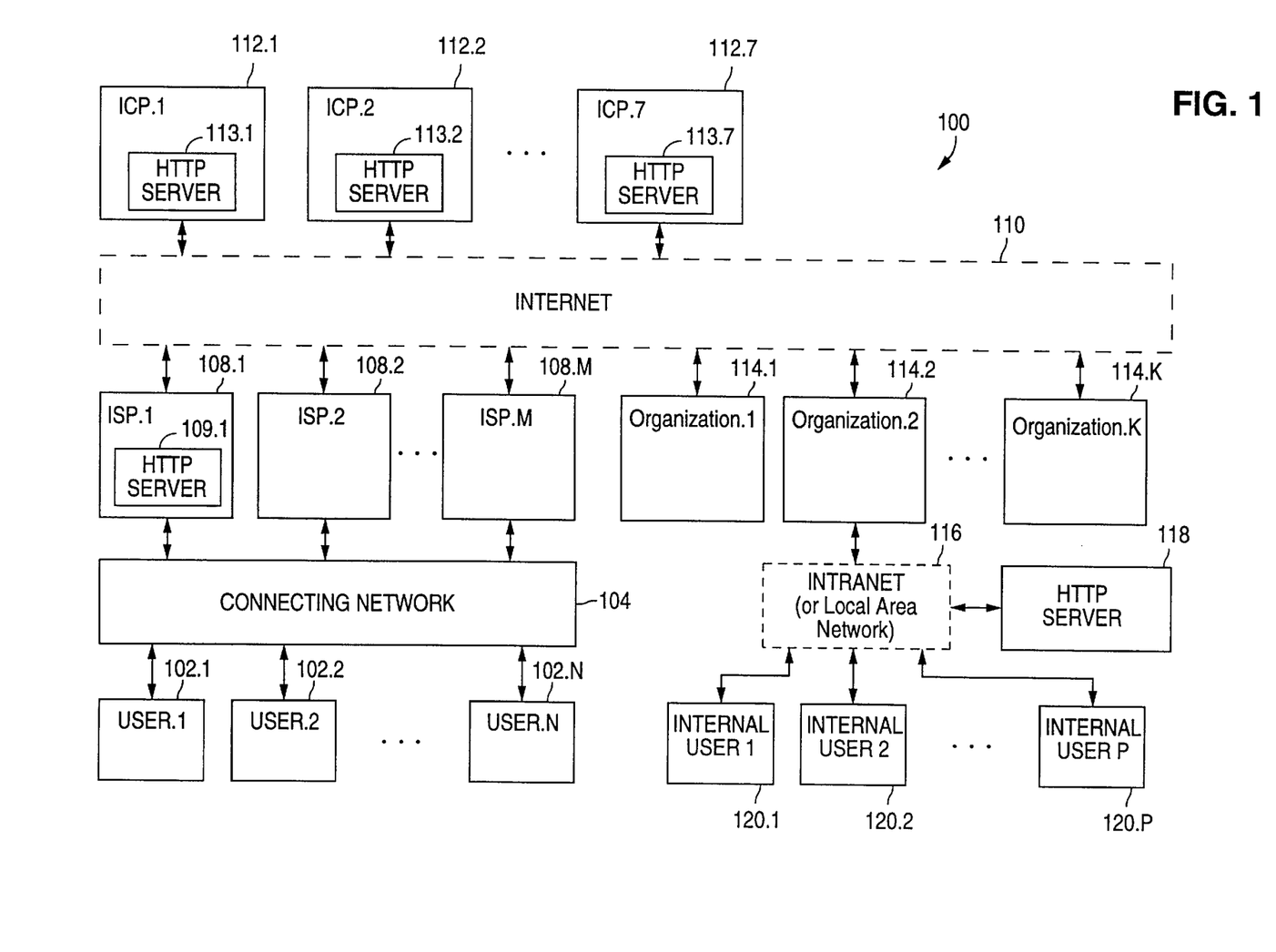
FIG. 1 depicts an exemplary network system, which can be used to perform the functions of the present invention.

FIG. 1 depicts an exemplary network system 100, which is able to perform the novel functions of the present invention. To the Internet, all ICPs, ISPs, and organizations that are connected to it can be deemed as network nodes.

As shown in FIG. 1, the network system 100 includes a plurality of user computers (or users) 102.1–102.n; a connecting network 104; a plurality of ISP nodes 108.1–108.m; the Internet 110; and a plurality of ICP nodes 112.1–112.7. To get access to the Internet 110, the user computers 102.1–102.n have to be first connected to one of the ISP nodes 108.1–108.m, via the connecting network 104. The connecting network 104 can be the public switched telephone network, wireless network, cable network, or even power network.

Each of the ISP nodes 108.1–108.m has the hardware and software to access the Internet 110, and may include an HTTP server for hosting an ISP web site. For example, ISP node 108.1 contains an HTTP web server 109.1 for hosting an ISP web site. Each of the ISP nodes has a unique Internet domain name and a range of IP addresses.

Each of the ICP nodes 112.1–112.7 has the hardware and software to access the Internet 110, and its respective HTTP server (113.1, 113.2, . . . , or 113.7). Each of the ICP nodes also has a unique Internet domain name and IP address.

In FIG. 1, to obtain web pages from an ICP node, a user computer first initiates a connection process for connecting the user computer to one of the ISP nodes 108.1, 108.2, . . . , or 108.m. By way of example, let us assume that the user computer 102.2 is a subscriber of the ISP node 108.m, and wants to obtain web pages from the ICP node 112.1. The user computer 102.2 initiates a connection process (an example of which is a modem call via the public switched telephone network) to the ISP node 108.m via the connecting network 104. After the completion of the connection process, the ISP node 108.m dynamically assigns an available IP address to the user computer 102.2. Then, the user computer 102.2 sends a service request to the ISP node 108.m via the connecting network 104. Upon receiving the service request from the user computer 102.2, the ISP node 108.m forwards the service request, together with the IP address assigned to the user computer 102.2, to the ICP node 112.1 via the Internet 110. The IP address can be used to identify both the user computer 102.2 and the ISP node 108.m. Upon receiving the service request from the ISP node 108.m, the HTTP server 113.1 in the ICP node 112.1 retrieves the home page and sends it to the ISP node 112.1 via the Internet 110. Upon receiving the home page from the ICP node 112.1, the ISP node 108.m forwards the home page to the user computer 102.2 via the connecting network 104. Upon receiving the home page, the user computer 102.2 can navigate through the web site of the ICP node 112.1 by selecting the page links contained in the home page. After the user computer 102.2 completes the modem call, the ISP node 108.m releases the IP address which was temporarily assigned to the user computer 102.2.

The network system 100 further includes a plurality of organization nodes 114.1–114.k. These organization nodes are owned by corporations, governmental institutions, or universities. Each of the organization nodes contains the hardware and software to access the Internet 110, and has a unique Internet domain name and IP address. Usually, an organization node has an HTTP server, and an Intranet (or local area network) infrastructure for inter-connecting its internal user computers (internal users) within the organization. For example, the organization node 114.2 has an Intranet (or local area network) 116 and an HTTP 118 for hosting a web site for the organization. Connected to the Intranet (or local area network) 116 are internal user computers (internal users) 120.1–120.p. The internal user computers 120.1, 120.2, . . . , 120.p may have dynamically assigned IP addresses or static IP addresses. Via the Intranet (or local area network) 116, the internal user computers can communicate with each other and get access to the web site contained in the HTTP server 118. Via the Intranet (or local area network) 116 and organization node 114.2, the internal user computers can get access to the Internet 110.

An internal user computer communicates with an ICP node through its respective organization node. By way of example, let us assume that internal user computer 120.2 wants to obtain web pages from the ICP node 112.2. To do so, the internal user computer 102.2 sends a service request to the organization node 114.2 via the Intranet (or local area network) 116. Upon receiving the service request from the internal user computer 120.2, the organization node 114.2 forwards the service request, together with the IP address assigned to the organization node 114.2, to the ICP node 112.2 via the Internet 110. Upon receiving the service request from the organization node 112.2, the HTTP server 113.2 in the ICP node 112.2 retrieves a home page and sends it to the organization node 114.2 via the Internet 110. Upon receiving the home page from the ICP node 112.2, the organization node 114.2 forwards the home page to the internal user computer 120.2 via the Intranet (or local area network) 116. Upon receiving the home page, the internal user computer 120.2 can navigate through the web site of the ICP node 112.2 by selecting the page links contained in the home page.

Typically, a web site stores information in a set of web page files, such as HTML, SHTML, DHTML, or CGI files (Note: HTML stands for Hypertext Mark Language, SHTML for Secure HTML, DHTML for Dynamic HTML, and CGI for Common Gate Interface). A web page file may contain one or more page links containing the path information to other web page files in the same web site. Thus, using a web browser, a user can access a home page file (the page file at the root level) of a web site. From the home page, the user can browse subsequent web page files by selecting links contained in the home page file. The subsequent web page files may further contain one or more page links, which can be further selected to browse web page files at the next level. At any level, a browser can browse back to the previous web page file and re-select page links from the previous web page file. A web page may contain page links (foreign page links) containing path information to the web pages of the other web sites. Upon selecting a foreign page link contained in a web page file, a service request is sent to the web site indicated by the path information in the foreign page link, to retrieve the web page in the foreign web site.

In addition, a web page file may contain links to other types of files, such as AVI, GIF, JPEG, and PNG files. (Note: GIF stands for Graphics Interchange Format, JPEG for Joint Photographic Expert Group, AVI for audio Video Interface, and PNG for Portable Network Graphic). A web page file may also contains applets. Upon receiving a web page file, a web browser can display it as a web page on a user computer.

Figure 2:
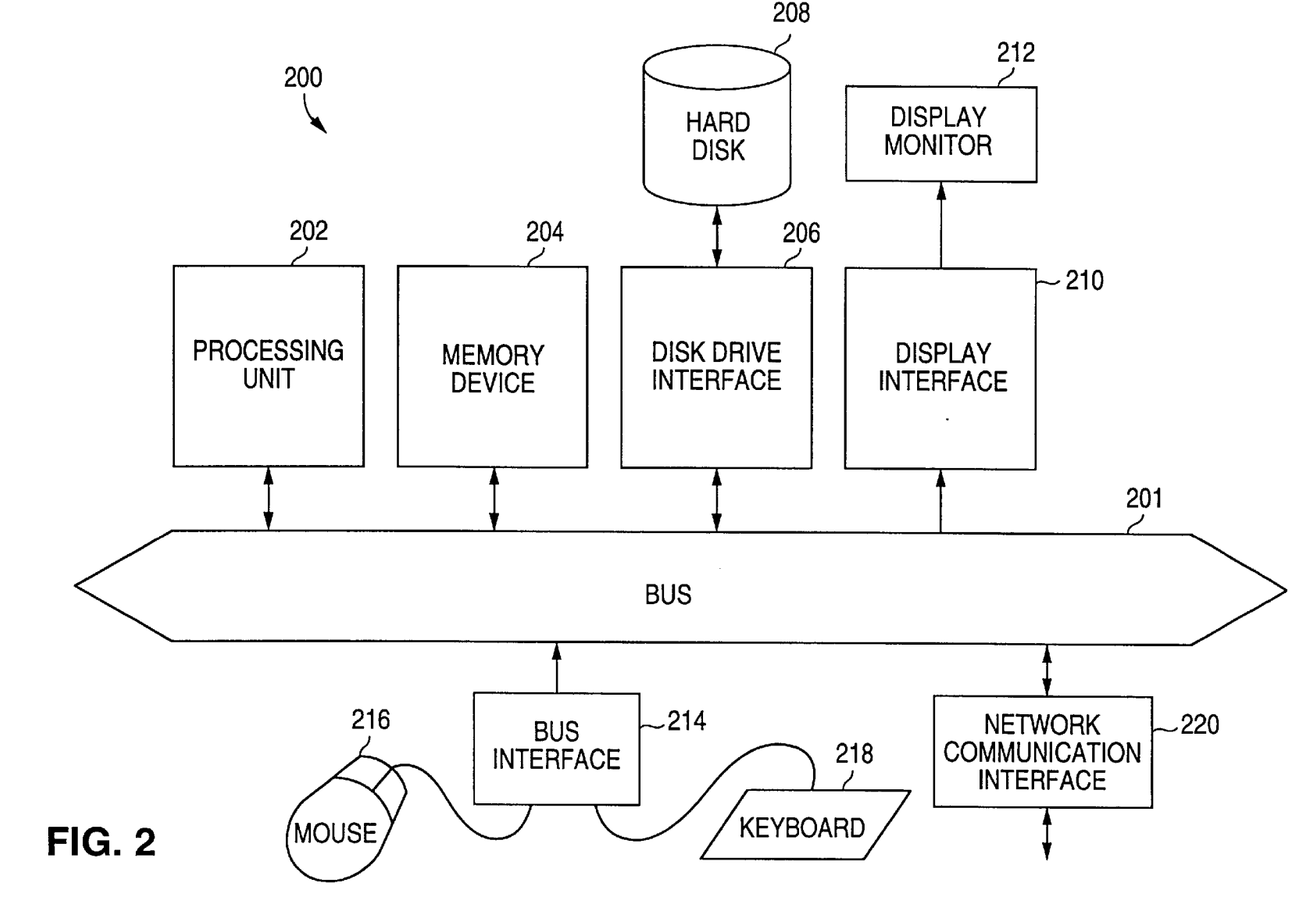
FIG. 2 depicts a block diagram illustrating an exemplary computer system, which can be used to implement the present invention.

FIG. 2 depicts a block diagram illustrating an exemplary computer system 200, which can be used as a hardware platform for an ISP node, an ICP node, or an organization node to perform the functions of the present invention.

As shown in FIG. 2, the computer system 200 includes a system bus 201, a processing unit 202, a memory device 204, a disk drive interface 206, a hard disk 208, a display interface 210, a display monitor 212, a serial bus interface 214, a mouse 216, a keyboard 218, and a network communication interface 220.

The hard disk 208 is coupled to the disk drive interface 206; the monitor display 212 is coupled to the display interface 210; and the mouse 216 and keyboard 218 are coupled to the serial bus interface 214. Coupled to the system bus 201 are the processing unit 202, the memory device 204, the disk drive interface 206, the display interface 210, and the network communication interface 220.

Memory device 204 stores data and programs. Operating together with the disk drive interface 206, the hard disk 208 also stores data and programs. However, memory device 204 has faster access speed than hard disk 208, while the hard disk 208 has higher capacity than memory device 204.

Operating together with the display interface 210, the display monitor 212 provides visual interfaces between the programs being executed and users, and displays the outputs generated by the programs.

Operating together with the serial bus interface 214, the mouse 216 and keyboard 218 provide inputs to the computer system 200.

The network communication interface 220 provides an interface between the computer system 200 and the Internet 110 in accordance with predetermined networking protocols.

The processing unit 202, which may include more than one processor, controls the operations of the computer system 200 by executing the programs stored in the memory device 204 and hard disk 208. The processing unit also controls the transmissions of data and programs between the memory device 204 and the hard disk 208.

Figure 3:
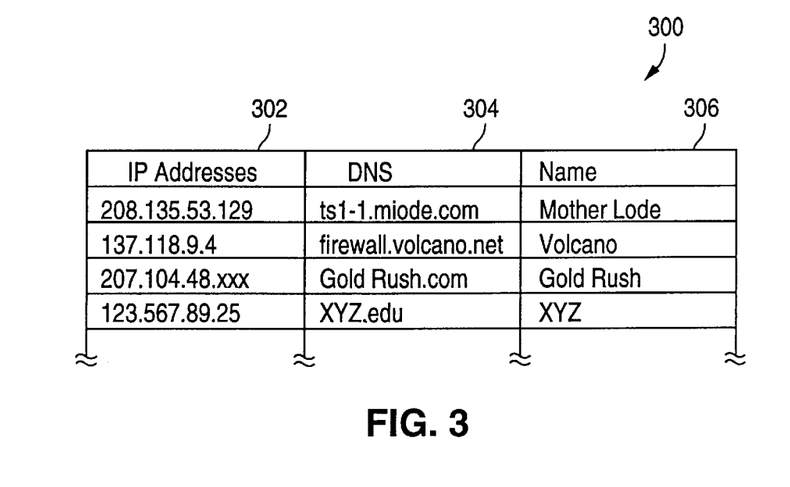
FIG. 3 depicts an exemplary participant database for storing the identification information for the ISP and organization nodes requiring to form customized web pages, in accordance with the present invention.

FIG. 3 depicts an exemplary participant database 300 located at an ICP node for storing the identification information for these ISP and organization nodes requiring to form customized web pages, in accordance with the present invention.

The participant database 300 has three fields: (1) an IP address field 302 containing the IP addresses for the participating ISP and organization nodes, (2) a DNS (Domain Name System) field 304 containing DNS information for the participant ISP and organization nodes, and (3) a name field 306 containing the names of the participant ISP and organization nodes.

In FIG. 3, the IP address "207.104.48.xxx" represents a range of IP addresses. Specifically, the "xxx" designates wild cards that will accept any IP address that matches the "207.104.48" portion of the IP address.

Figure 4:
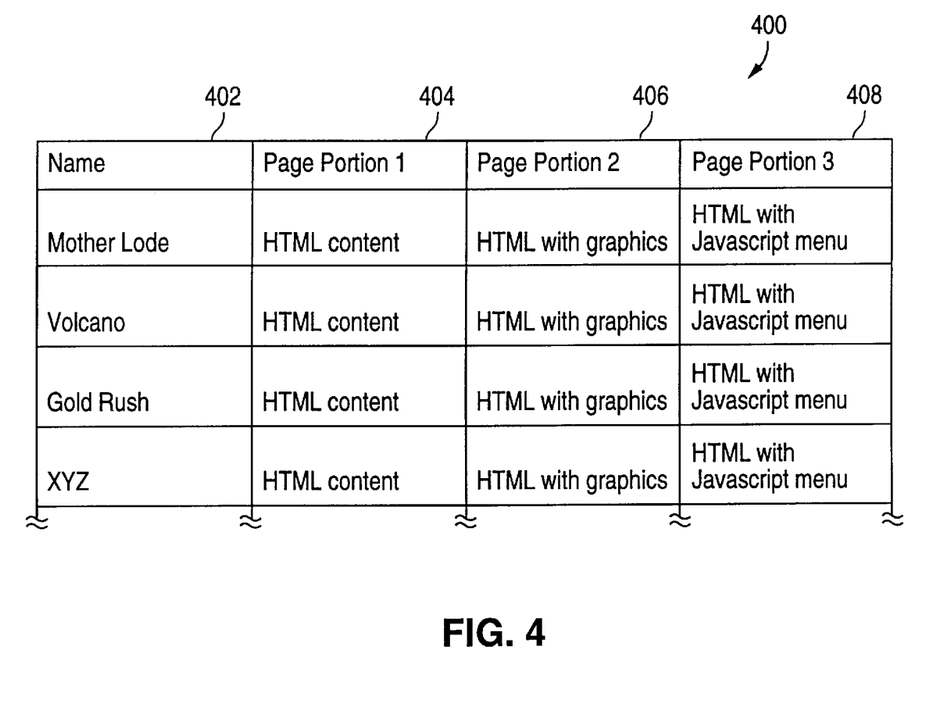
FIG. 4 depicts an exemplary participant file database for storing the file information for the participating ISP and organization nodes, in accordance with the present invention.

FIG. 4 depicts an exemplary participant file database 400 located at an ICP node for storing file information for the participating ISP and organization nodes, in accordance with the present invention.

The participant file database 400 has four fields: (1) a name field 402 containing the names of the participating ISP and organization nodes, (2) a page portion 1 field 404 containing a file to be displayed in a first predetermined position in a customized web page, (3) a page portion 2 field 406 containing a file to be displayed in a second predetermined position in the customized web page, and (4) a page portion 3 field containing a file to be displayed in a third predetermined position in the customized web page. The files in the three page portion fields can be provided by ISPs and organizations, or designed by an ICP.

In operation, an ICP node is able to determine whether a received service request is from a participating ISP or organization node by looking up the participant database 300. Upon finding the ISP name of a participating ISP or organization node in the participant database 300, the ISP node then looks up the associated files in the participant file database 400 based on the ISP name. It should be noted that the databases 300 and 400 can be combined as one database.

Figure 5:
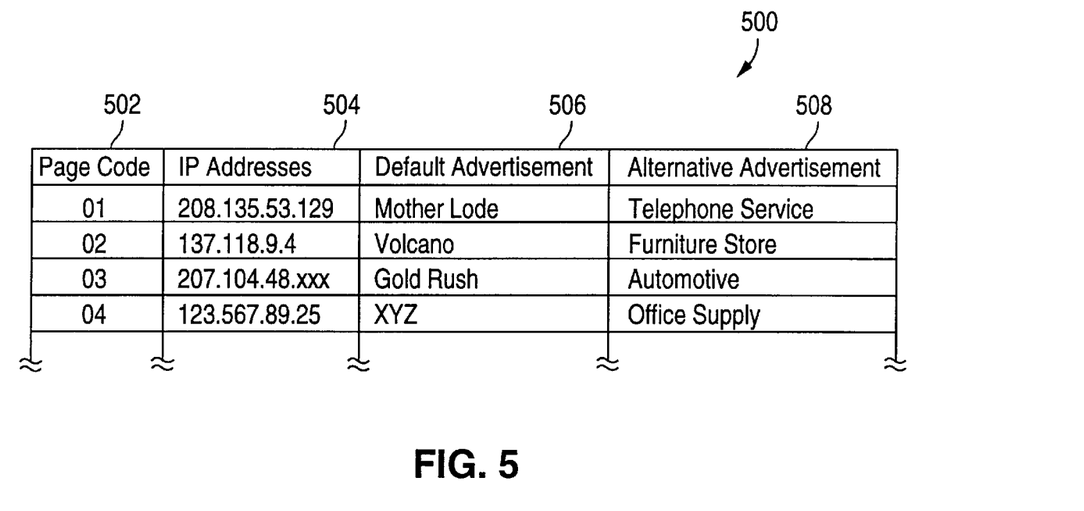
FIG. 5 depicts an exemplary advertisement database for storing the advertisement information for these ISP and organization nodes requiring to form customized web pages, in accordance with the present invention.

FIG. 5 depicts an exemplary advertisement database 500 located at an ICP node for storing the advertisement information, in accordance with the present invention.

The advertisement database 500 has four fields: (1) a page code field 502 containing individual web page files contained in a customized web page, (2) an IP address field 504 containing the IP addresses for the ISP and organization nodes, (3) a default advertisement field 506 containing the names of the ISP and organization nodes who own the default advertisements, and (4) an alternative advertisement field 508 containing the advertisement files to replace the default advertisements in field 506 as needed.

In FIG. 5, the advertisements for Mother Lode, Volcano, Gold Rush, and XYZ are preselected to be included in web pages 01, 02, 03, and 04, respectively. The alternative advertisements for Mother Lode, Volcano, Gold Rush, and XYZ are used to replace the respective default advertisements as needed.

Figure 6:
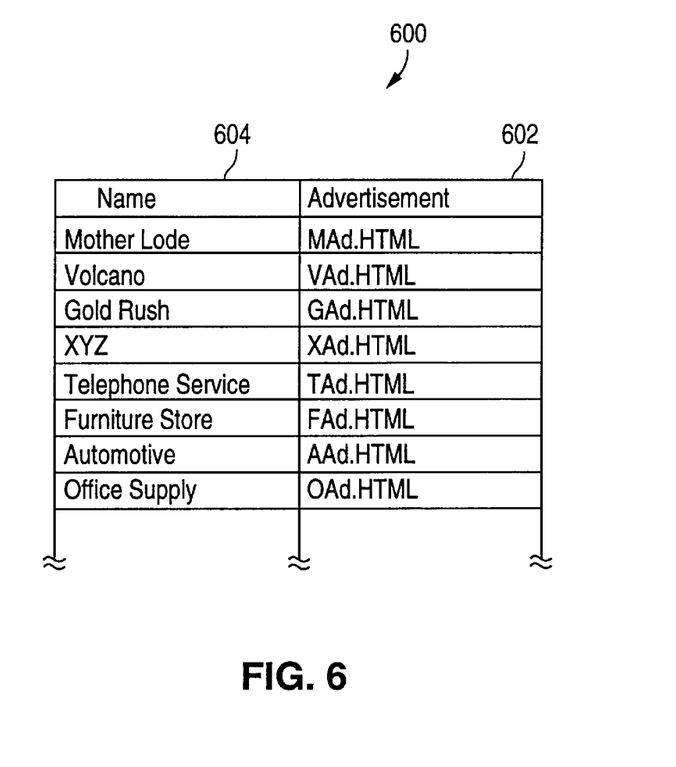
FIG. 6 depicts an exemplary advertisement file database for storing the advertisement files to be displayed, in accordance with the present invention.

FIG. 6 depicts an exemplary advertisement file database 600 located at an ICP node for storing the advertisement files to be displayed, in accordance with the present invention.

The advertisement file database 600 has two fields: (1) an advertisement file field 602 containing advertisement file names, and (2) a name field 604 containing advertisement owners. It should be noted that the databases 500 and 600 can be combined into one database.

In operation, after determining that a service request is from a participating network node, an ICP node first looks up the advertisement database 500, to locate the owner's name of the advertisement to be displayed. The ICP node then locates the corresponding file in the advertisement file database 600.

Figure 7:
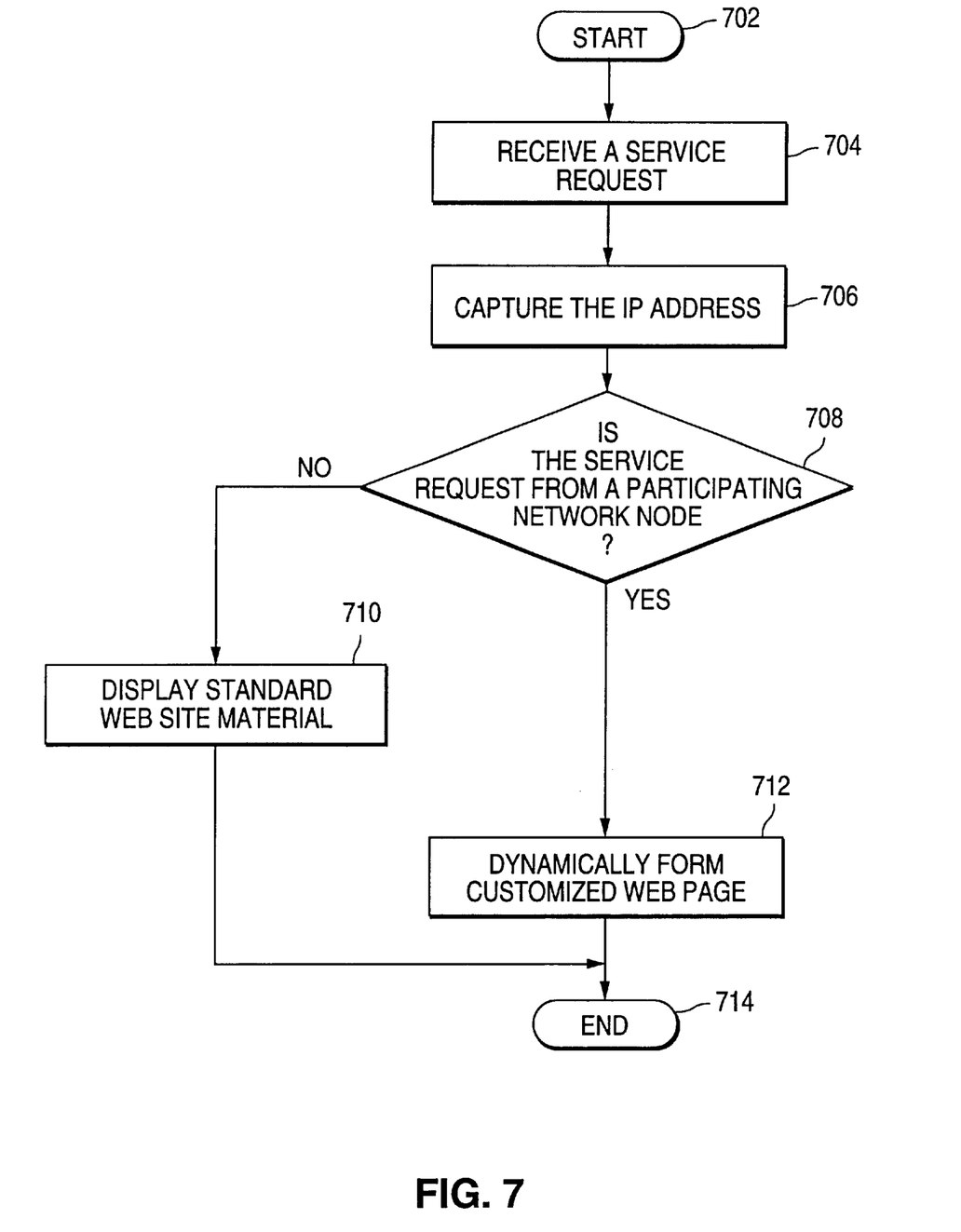
FIG. 7 depicts a flowchart illustrating a process of dynamically forming customized web pages for an ISP or organization node at an ICP, in accordance with the present invention.

FIG. 7 depicts a flowchart illustrating the process of dynamically forming a customized web page for an ISP or organization node at an ICP node, in accordance with the present invention. In describing FIG. 7, it is assumed that:

(1) The ICP node has installed a hardware platform (as shown in FIG. 2) and an application, which are capable of providing web page customization service;

(2) The ICP node has established page files containing the standard web site material for the ICP;

(3) The ICP node has created a participant database as shown in FIG. 3 for storing the IP addresses for all participant ISP and organization nodes; and (4) The ICP node has created a participant file database as shown in FIG. 4 for storing the names and locations of the files to be included in the page files designed for the ICP node.

In FIG. 7, at step 704, the ICP node receives a service request from a network node.

At step 706, the ICP node captures the IP address contained in the service request.

At step 708, the ICP node compares the captured IP address against the IP addresses stored in the participant database as shown in FIG. 3, to determined whether the network node is a participating ISP or organization node.

At step 708, if the ICP node cannot find the captured IP address in the participant database, the process is led to step 710 to display the page files (including the standard web site material) designed for the ICP node. If the ICP node finds the captured IP address in the participant database, the process is led to step 712.

At step 712, the ICP node dynamically forms customized web pages for the participating network node. Specifically, the ICP locates the page portions in the participant file database as shown in FIG. 4. These page portions are then included in the page files designed for the ICP node.

The embodiment shown in FIG. 7 uses IP address to identify a participating network node. However, it should be noted that the DNS information can also be used to identify a participating network node.

Figure 8:
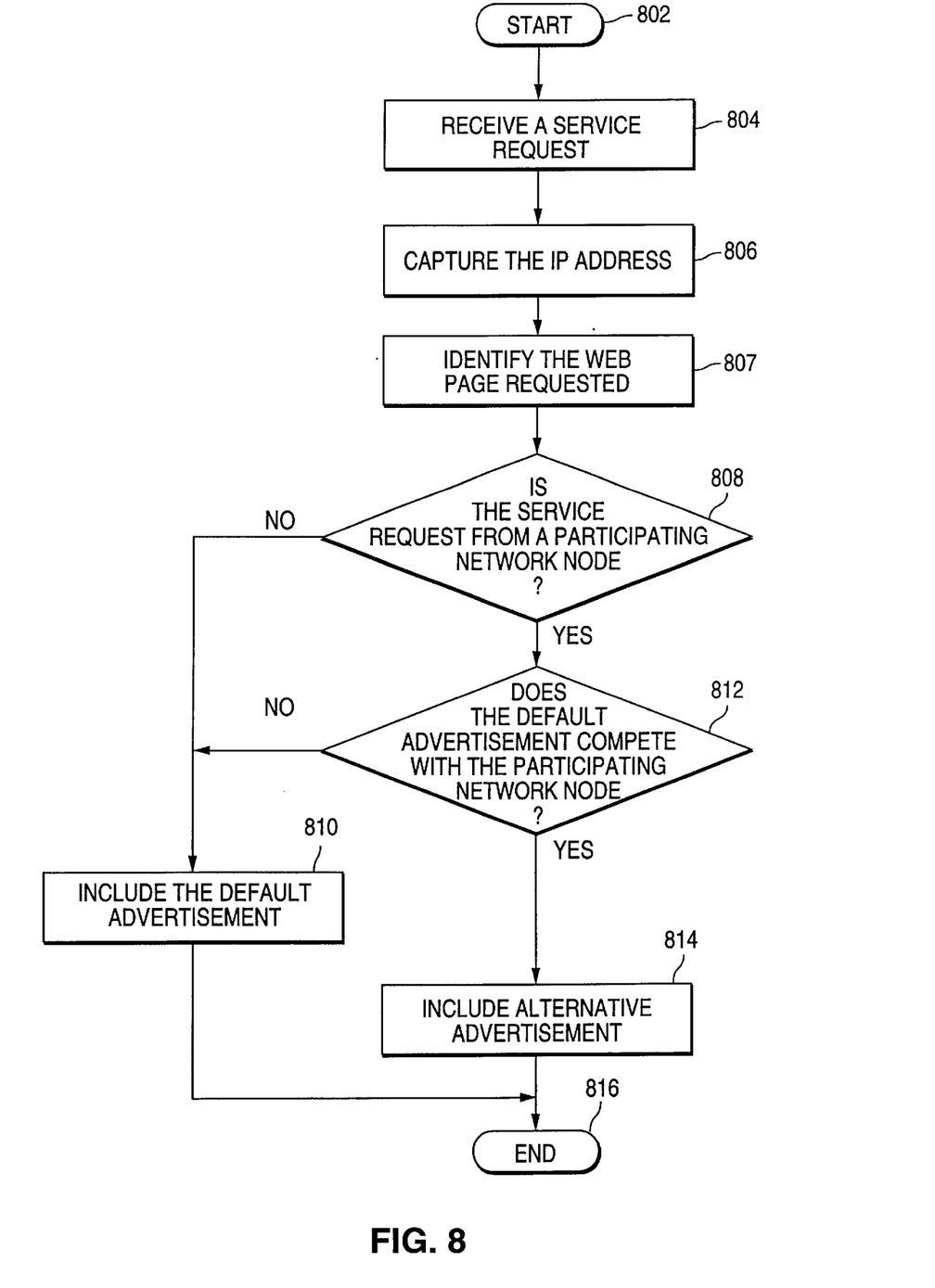
FIG. 8 depicts a flowchart illustrating a process of selecting advertisements included in a customized web page for an ISP or organization node at an ICP, in accordance with the present invention.

FIG. 8 depicts a flowchart illustrating the process of selecting advertisements to be included in customized web pages for an ISP or organization node at an ICP node, in accordance with the present invention. In describing FIG. 8, in addition to the assumptions in connection with the discussion of FIG. 7, it is further assumed that:

(5) the ICP node has created an advertisement database as shown in FIG. 5;

(6) the ICP node has created an advertisement file database as shown in FIG. 6; and (7) the web site of the ICP node includes four web pages coded 01, 02, 03, and 04, respectively, as shown in FIG. 5.

In FIG. 8, at step 804, the ICP node receives a service request from a network node. The service request contains the information for identifying the web page requested.

At step 806, the ICP node captures the IP address contained in the service request.

At step 807, the ICP node identifies the web page requested by the service request.

At step 808, the ICP node compares the captured IP address against the IP addresses stored in the participant database as shown in FIG. 3, to determined whether the service request is from a participating ISP or organization node.

At step 808, if the ICP node cannot find the captured IP address in the participant database, the process is led to step 810, and if the ICP node finds the captured IP address in the participant database, the process is led to step 812.

At step 810, the ICP node includes the default advertisements in the identified web page. Using the web page structure shown in FIG. 5 as an example, if the service request is not from a participating network node and the identified web page is 02, the ICP node includes the default advertisement for Volcano in the web page 02. The process is then led to step 816 to end the process.

At step 812, if the service request is from a participating network node, the ICP node further determines whether the default advertisement is competing with the participating network node. If the default advertisement is not competing with the participating network node, the process is led to step 810 to include the default advertisement in the identified web page. Using the web page structure shown in FIG. 5 as an example, if the identified web page is 01, the ICP node includes the default advertisement for Mother Lode in web page 01. The process is then led to step 816 to end the process.

At step 814, if the default advertisement is competing with the participating network node, the ICP node includes the alternative advertisement in the identified web page. Using the web page structure shown in FIG. 5 as an example, if the identified web page is 03, the ICP node includes the alternative advertisement of Automotive in the web page 03. The process is then led to step 816.

In FIGS. 5 and 6, the alternative advertisements are so organized that they will not be competing with the participating ISP or organization node that forwards the service request. When a viewer comes to the ICP node, it will see the default advertisements unless the viewer is a subscriber to a competing participating ISP or organization node. If the viewer is a subscriber of a competing participating ISP or organization node, the viewer will see an alternative advertisement. This keeps participating ISP and organization nodes from poaching each others customers.

Figure 9:
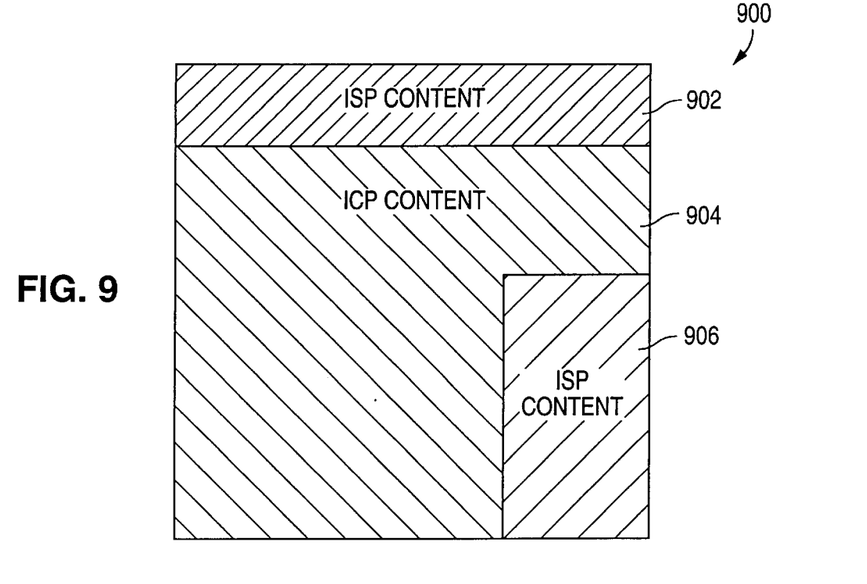
FIG. 9 depicts an exemplary screen display showing a portion of a web page dynamically formed for an ISP or organization node.

FIG. 9 depicts an exemplary screen display 900 showing a portion of the web page dynamically formed for a participating ISP or organization node, in accordance with the present invention.

The screen display 900 includes three regions 902, 904, and 906. Specifically, region 904 displays the contents contained in the files designed for the ICP node, and the regions 902 and 906 display the contents contained in the files designed for the participating node. The files designed for regions 904 and 906 can be stored in the participant database file shown in FIG. 4. The regions 902 and 906 may contain customized graphics, applets, links, sounds, and text.

Figure 10:
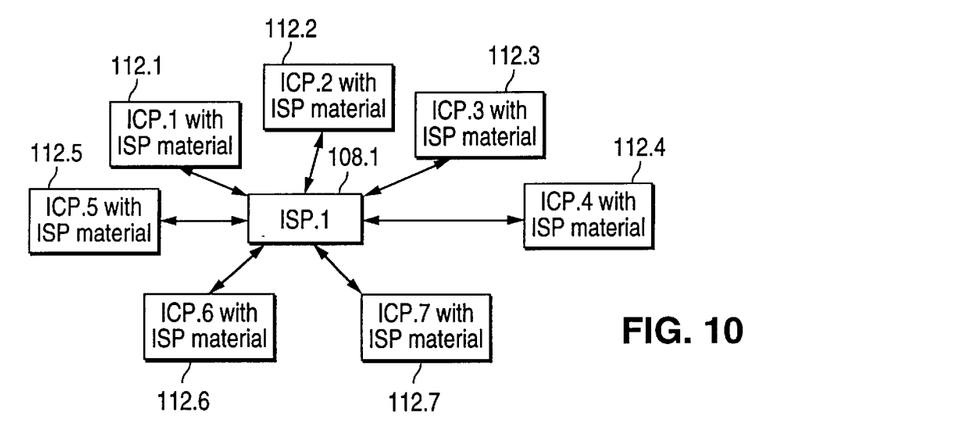
FIG. 10 depicts different customized web sites dynamically formed by different ICPs for an ISP or organization, in accordance With the present invention.

FIG. 10 depicts different customized web sites dynamically formed by different ICPs for an ISP, in accordance with the present invention. In describing FIG. 10, it is assumed that the ICP nodes 112.1–112.7 shown in FIG. 1 are all capable of dynamically forming web sites for participating network nodes, and that the ISP node 108.1 has obtained the web page customization service from all ICP nodes 112.2–112.7 show in FIG. 1.

As shown in FIG. 10, by forwarding service requests from its subscribe users to the ICP nodes 112.1–112.7 shown in FIG. 1, the ISP node 108.1 can have seven different customized web sites containing the material specifically designed for the ISP node 108.1.

The principle shown in FIG. 10 also applies to the organization nodes 114.1–114.k shown in FIG. 1. Specifically, by forwarding service requests from its internal users to the ICP nodes 112.1–112.7 shown in FIG. 1, an organization node can have seven different customized web sites containing the material specifically designed for the organization node.

Figure 11:
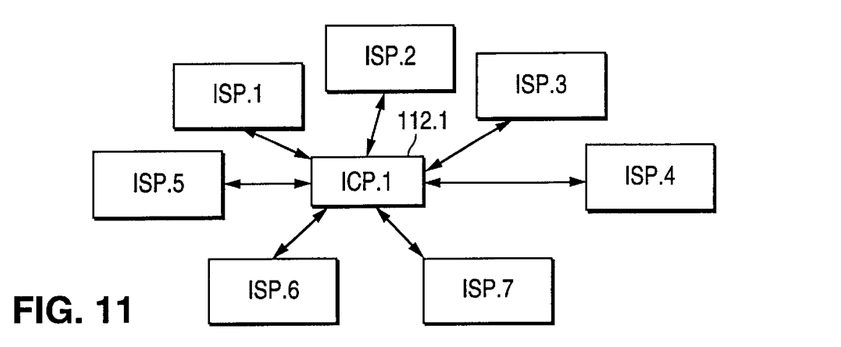
FIG. 11 depicts different customized web sites dynamically formed by an ICPs in response to service requests from different participating ISP nodes, in accordance with the present invention.

FIG. 11 depicts different customized web sites dynamically formed at an ICPs in response to service requests from different participating ISP nodes, in accordance with the present invention.

As shown in FIG. 11, using the present invention, an ICP node can form partnerships with many ISP and organization nodes. For example, Yahoo Corporation (an ICP) may form partnerships with AT&T, MCI, Sprint, and Netcom, in which Yahoo's content appears in "melded" form when viewed by their subscribers. The principle shown in FIG. 11 also applies to the organization nodes 114.1–114.k shown in FIG. 1.

In the embodiments of the present invention, the databases 300, 400, 500, and 600 can be stored in the memory device 204 or the hard disk 208. The application to perform the steps shown in FIGS. 7 and 8 can be stored in the memory device 204 or the hard disk 208, and executed by the processing unit 202.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. A method for dynamically forming customized web pages for a first type network node at a second type network node, comprising the steps of:

forming at least a page file for the first type network node;

forming at least a page file for the second type network node;

receiving a service request from the first type network node;

identifying the first type network node based on the service request; and forming a customized page file formed for the first type network node by including the page file formed for the first type network node within the page file for the second type network node.

2. The method of claim 1, wherein the first type network node is an ISP node, and the second type network node is an ICP node.

3. The method of claim 1, wherein the first type network node is an organization node, and the second type network node is an ICP node.

4. The method of claim 1, wherein the customized page file includes customized graphics, sounds, applets, links, and text.

5. The method of claim 1, wherein the customized page file includes customized advertisements.

6. The method of claim 1, wherein:

the service request includes an IP address for identifying the first type network node, and identifying the first type network node based on the service request comprises using the IP address included in the service request to identify the first type network node.

7. A method for providing web page customization service to a plurality of first type network nodes at a second type network node, comprising the steps of:

forming at least a page file for each of the first type network nodes;

forming at least a page file for the second type network node;

receiving a service request from one of the first type network nodes;

determining whether the first type network node participates in the web page customization service;

if the first type network node participates in the web page customization service, forming a customized page file for the service request by including the page file formed for the first type network node within the page file formed for the second type network node; and if the first type network node does not participate in the web page customization service, forming a page file for the service request by using the page file formed for the second type network node.

8. The method of claim 7, wherein the first type network nodes are ISP nodes, and the second type network node is an ICP node.

9. The method of claim 7, wherein the first type network nodes are organization nodes, and the second type network node is an ICP node.

10. The method of claim 7, wherein the customized page file includes customized graphics, sounds, applets, links, and text.

11. The method of claim 7, wherein the customized page file includes customized advertisements.

12. The method of claim 7, wherein:

the service request from one of the first type network nodes includes an IP address for identifying the first type network node, and determining whether the first type network node participates in the web page customization service comprises using the IPI address included in the service request to identify the first type network node.

13. A method for providing web page customization service to a plurality of first type network nodes at a second type network node, comprising the steps of:

forming a plurality of advertisements for the first type network nodes;

forming at least a page file for the second type network node;

receiving a service request from one of the first type network nodes;

identifying advertisements for the first type network node; and forming a customized page file for the first type network node by including the identified advertisements within the page file formed for the second type network node.

14. The method of claim 13, wherein the first type network nodes are ISP nodes, and the second type network node is an ICP node.

15. The method of claim 13, wherein the first type network nodes are organization nodes, and the second type network node is an ICP node.

16. The method of claim 13, wherein the identified advertisements do not cause negative impact on the owner of the first type network node.

17. An apparatus for dynamically forming a customized web page for a first type network node at a second type network node, comprising:

means for forming at least a page file for the first type network node;

means for forming at least a page file for the second type network node;

means for receiving a service request from the first type network node;

means for identifying the first type network node based on the service request; and means for forming a customized page file formed for the first type network node by including the page file formed for the first type network node within the page file for the second type network node.

18. The apparatus of claim 17, wherein the first type network node is an ISP node, and the second type network node is an ICP node.

19. The apparatus of claim 17, wherein the first type network node is an organization node, and the second type network node is an ICP node.

20. The apparatus of claim 17, wherein the customized page file includes customized graphics, sounds, applets, links, and text.

21. The apparatus of claim 17, wherein the customized page file includes customized advertisements.

22. An apparatus for providing web page customization service to a plurality of first type network nodes at a second type network node, comprising:

means for forming at least a page file for each of the first type network nodes;

means for forming at least a page file for the second type network node;

means for receiving a service request from one of the first type network nodes;

means for determining whether the first type network node participates in the web page customization service;

means for forming a customized page file for the service request by including the page file formed for the first type network node within the page file formed for the second type network node, if the first type network node participates in the web page customization service; and means for forming a page file for the service request by using the page file formed for the second type network node, if the first type network node does not participate in the web page customization service.

23. The apparatus of claim 22, wherein the first type network nodes are ISP nodes, and the second type network node is an ICP node.

24. The apparatus of claim 22, wherein the first type network nodes are organization nodes, and the second type network node is an ICP node.

25. The apparatus of claim 22, wherein the customized page file includes customized graphics, sounds, applets, links, and text.

26. The apparatus of claim 25, wherein the customized page file includes customized advertisements.

27. An apparatus for providing web page customization service to a plurality of first type network nodes at a second type network node, comprising:

means for forming a plurality of advertisements for the first type network nodes;

means for forming at least a page file for the second type network node;

means for receiving a service request from one of the first type network nodes;

means for identifying advertisements for the first type network node; and means for forming a customized page file for the first type network node by including the identified advertisements within the page file formed for the second type network node.

28. The apparatus of claim 27, wherein the first type network nodes are ISP nodes, and the second type network node is an ICP node.

29. The apparatus of claim 27, wherein the first type network nodes are organization nodes, and the second type network node is an ICP node.

30. The apparatus of claim 27, wherein the identified advertisements do not cause negative impact on the owner of the first type network node.

* * * * *